United States Patent
Frazier et al.

[11] Patent Number: 5,049,180
[45] Date of Patent: Sep. 17, 1991

[54] HIGH-ANALYSIS ACID-TYPE FERTILIZER SOLUTIONS

[75] Inventors: Alva W. Frazier, Florence, Ala.; Yong K. Kim, Jonesboro, Ga.

[73] Assignee: Tennessee Valley Authority, Muscle Shoals, Ala.

[21] Appl. No.: 450,483

[22] Filed: Dec. 14, 1989

[51] Int. Cl.$^5$ .................... C05C 9/00; C05C 1/00; C05G 21/00
[52] U.S. Cl. ............................ 71/29; 71/30; 71/64.1
[58] Field of Search .................. 71/1, 11, 27–30, 71/34, 59, 63, 64.10

[56] References Cited

U.S. PATENT DOCUMENTS

| | | | |
|---|---|---|---|
| 4,175,943 | 11/1979 | Jordaan et al. | 71/29 |
| 4,531,962 | 7/1985 | Achora et al. | 71/29 |
| 4,895,983 | 1/1990 | Nakayama et al. | 71/29 X |

Primary Examiner—Ferris H. Lander
Attorney, Agent, or Firm—Robert A. Petrusek

[57] ABSTRACT

Unusually high-analysis low-temperature-stable solution-type fertilizers are produced by mixing urea and phosphoric acid with urea-ammonium nitrate solution (UAN). The ratio of $P_2O_5$ to total nitrogen and the ratio of $CO(NH_2)_2$—N(nitrogen) to $NH_4NO_3$—N(nitrogen) must be maintained within broad specified parameters in order to ensure the production of the instant high-analysis clear-liquid fertilizers which are stable at temperatures as low as 0° C. For example, to produce a 35 percent total plant nutrient (TPN) product, the weight ratio for $P_2O_5$:N (total) must be within the range of about 0.316 to about 0.538, the weight ratio of urea-N to $NH_4NO_3$—N+$P_2O_5$ must be in the rang of 1.41 to 1.59, and the weight ratio of $CO(NH_2)_2$:$NH_4NO_3$ must be in the range of 15.25 to 3.75. Similar solutions may be produced by dissolving solid urea and ammonium nitrate in pure or impure phosphoric acid or by utilizing urea.$H_3PO_4$ obtained from impure wet-process type phosphoric acid or by mixing the urea phosphate with UAN. The pH of the resulting product solutions ranges from 2.0 at $P_2O_5$:N (total) of 0.33 to a pH of 1.6 when the $P_2O_5$:N (total) is 0.5.

12 Claims, 4 Drawing Sheets

Solubility Diagram in System Urea—Ammonium Nitrate-Urea Phosphate-Water at 0°C

*Solubility Diagram in System Urea–Ammonium Nitrate–Urea Phosphate–Water at 0°C*

Solubility Diagram in System Urea–Ammonium Nitrate–Urea Phosphate–Water at 0°C

*34% TPN Island*

HIGH-ANALYSIS ACID-TYPE FERTILIZER SOLUTIONS

The invention herein described may be manufactured and used by or for the Government for governmental purposes without the payment to us of any royalty therefor.

INTRODUCTION

The present invention relates to newly discovered "phase diagram islands" and to the effecting of heretofore unknown high-analysis solution-type fertilizers represented by such islands, which solutions can be produced conveniently by the mixing of urea and phosphoric acid with urea-ammonium nitrate (UAN) solution. As is noted herein, an important feature for effecting, or otherwise forming or producing the solutions represented by such phase diagram islands is to carefully maintain both the ratio of phosphate, expressed in the normal manner as $P_2O_5$, to the amount of total nitrogen represented by both the urea nitrogen and the ammonium nitrate nitrogen and the ratio of urea-nitrogen to ammonium nitrate-nitrogen in order to thereby yield heretofore unknown and unattainable clear-liquid fertilizers which are stable as solutions and do not salt out or exhibit post-production precipitates at temperatures of 0° C. or higher. Furthermore, the high-analysis solution fertilizers produced by the practice of the instant invention must have a specific range of weight ratios between the three main constitutents thereof: namely, $P_2O_5$, urea-nitrogen, and ammonium nitrate-nitrogen. Accordingly, for a total plant nutrient (TPN) of 34 percent the desired weight ratio of $P_2O_5$ to total nitrogen ranges from 0.613 to 0.124, and the urea-nitrogen to ammonium nitrate-nitrogen weight ratio ranges from about $1 \times 10^6$ to about 2.42. For a TPN content of 35 percent, the most preferred $P_2O_5$ to total nitrogen ranges from 0.538 to 0.316 and the urea-nitrogen to ammonium nitrate-nitrogen ranges from 15.25 to 3.75. In the instance of 34 percent TPN, the weight ratio of urea-nitrogen to ammonium nitrate-nitrogen plus $P_2O_5$ ranges from about 1.24 to about 1.81 and for a 35 percent TPN it ranges from about 1.41 to about 1.59.

The UAN may be any of a number of commercially available nitrogen solutions usually containing about 34 percent urea, about 46 percent ammonium nitrate, and about 20 percent water, with predetermined amounts of additional solid urea dissolved therein. It has also now been discovered that when urea is added along with such conventional urea-ammonium nitrate solution (normally 32 percent nitrogen) as the starting material, thereby increasing the phosphoric acid input along with the increased input of urea, the resulting solution products can, quite unexpectantly, contain in solution, a TPN ($N + P_2O_5 + K_2O$) of nominally 35 percent at 0° C. (actually, as much as 35.9 percent).

BACKGROUND OF THE INVENTION

1. Field of the Invention

The present invention relates to the production of high-analysis solution-type fertilizers, said fertilizer solutions being produced by the reaction of phosphoric acid with commercially available nitrogen solutions such as those containing 34 percent urea, 46 percent ammonium nitrate, and 20 percent water, with a specified amount of additional solid urea dissolved in such solutions. In the production of the instant, new, and novel high-analysis solutions, the typical grades produced thereby range from 24-12-0 or 25-11-0 to 30-4-0 and remain as clear solutions without any precipitation occurring therein for substantial periods of time at temperatures as low as 0° C.

It now has been discovered that these high-analysis solutions, i.e., 35 percent TPN fertilizers, must have specific ratios maintained between the three main components: $P_2O_5$, urea-nitrogen, and ammonium nitrate-nitrogen. For the sake of convenience to the reader, the urea (nitrogen) and/or the ammonium nitrate (nitrogen) may oftentimes hereinafter be simply referred to as urea-N or ammonium nitrate-N, respectively. Additionally, as noted supra, there must be maintained a specific range of weight ratios between the total phosphate values, expressed as $P_2O_5$, and total nitrogen content of such solutions. Thusly, three separate but interactive or interrelated proportions or ratio ranges must be maintained, e.g., the required proportion of $P_2O_5$ to total nitrogen for TPN of 35 percent is kept at a weight ratio of between 0.538 and 0.316 (about 0.3 to 0.5), the required proportion of urea-N to ammonium nitrate-N is kept between about 15:1 to about 4:1 (weight ratio ranging between about 15 and about 4), and the required proportion of urea-N to ammonium nitrate-N plus $P_2O_5$ is kept between a weight ratio of about 1.24 to about 1.81 for 34 percent TPN (1.41 to 1.59 for 35 percent TPN).

2. Description of the Prior Art

Urea phosphoric acid adducts and their production have been known for over 60 years. In U.S. Pat. No. 1,440,056, Clarkson, et al., Dec. 26, 1922, teach a process for the production of urea phosphoric acid. In their process, urea was reacted with phosphoric acid thereby producing a urea phosphoric acid adduct. The resulting urea phosphoric acid adduct could be dissolved in water for the subsequent production of N-P type fertilizer solution, with the highest analysis solution thus obtained being 34.8 percent total nutrient content at 0° C. for a singular point. [Kaganski, Z. M., Gordienko, V. M., "Mutual Solubility in the System $CO(NH_2)_2$—$H_3PO_4$—$HNO_3$—$H_2O$," *Zhur. Prik. Khim.* 40 (2), 284–90 (1967). Luff, B. B., Reed, R. B., "Enthalpies of Reaction of Phosphoric Acid Solutions and Urea at 25° C.," *J. Chem. Eng. Data* 20 (4), 420–31 (1975). Nabier, M. N., et al., "Solubility of Ternary and Quaternary Systems of Urea Nitrate and Some Components of Mineral Fertilizers," *Uzbek. Khim. Zhur.* 6, 3–9 (1980). Narathmetor, N. N., Berenzhanov, B. A., "Solubility Polytherm for the System $CO(NH)_2$—$H_3PO_4$—$H_2O$," *Zhur. Prik. Khim.* 46 (11), 2405–8 (1973).].

Likewise, the three-component system of $CO(NH_2)_2$—$NO_3$—$H_2O$ was studied in considerable detail by Sokolov, V. A., "The Equilibrium in the System Urea-Ammonium Nitrate-Water," *J. Gen. Chem.* (USSR) 9, 753–8 (1939). Kummel determined the solubility concentration in the system $CO(NH)_2$—$H^+$—$NH_4^+$—$NO_3^-$—$PO_4^{3-}$—$H_2O$ and defined many invariant points, but did not provide solubility data between the invariant points which are necessary to predict solution fertilizer compositions [Kummel, R., "Crystallization Equilibria in the Quinary System at 25° C.," *Z. Chemie* 17 (12), 454–5 (1977)].

Narkhodzhaev studied the solubility in the system urea-ammonium nitrate-phosphoric acid-water, but his study was limited to only one weight ratio of urea to ammonium nitrate, i.e., (45:55) [Narkhodzhaev, A. K., Takhtaev, S., Nabier, M. N., "Study of Solubility in Urea-Ammonium Nitrate-Phosphoric Acid-Water System"].

Other researchers who studied the solubility of urea and phosphoric acid are as follows:

Kaganski, L. M., Babenko, A. M., "Solubility in the Quatenary System Urea-Ammonium Nitrate-Monoammonium Phosphate Water," *Zhur. Prik. Khim* 43 (4), 742-9 (1970).

Kaganski, L. M., Babenko, A. M., "Study of Solubility in the System $NH_4H_2PO_4$—$(NH_4)_2HPO_4$—$CO(NH_2)_2$—$H_2O$," *Zhur. Prik. Khim.* 403 (11), 2421-5 (1970).

Willard, J. W., et al., "Solubility in the System $CO(NH_2)_2$—$H_3PO_4$—$NH_3$—$H_2O$ at 0°, 25°, and 50° C.," *J. Chem. Eng. Data* 29 (1), 52-4 (1984).

More recently, researchers have produced solutions from urea reacted with phosphoric acid or combinations of phosphoric acid and sulfuric acid, see U.S. Pat. No. 4,315,763, Stoller, Feb. 16, 1982, and U.S. Pat. No. 4,461,913, Lewis, et al., July 24, 1984, assigned to the assignee of the present invention. These products, however, do not contain the desirable component, nitrate nitrogen. Although crops do absorb some ammonium nitrogen, they more readily absorb most of their nitrogen requirements as nitrate nitrogen. It is, of course, appreciated that microorganisms in the soil nitrify ammonia nitrogen and convert it to nitrate nitrogen; however, the conversion reaction can require considerable amounts of time, thereby resulting in some loss of ammonia nitrogen to the vapor state. Thusly, there are distinct advantages in having nitrogen in the nitrate form for immediate growth response and reduction of ammonia losses.

A still more recent development in this prior art is taught in U.S. Pat. No. 4,531,962, Achorn, et al., July 30, 1985, assigned to the assignee of the present invention, wherein urea-ammonium nitrate solution and urea are reacted with phosphoric or sulfuric acid to produce acid-type fertilizer solutions. However, Achorn, et al.'s, study was limited to a rather small range of weight ratio $CO(NH_2)_2$—$N:NH_4NO_3$—$N$. Their teachings indicate that the most promising products have such a weight ratio in the range of from 1.875 to 2.625. It has long been presumed that Achorn, et al., confined their study to this narrow range of ratios of urea-N to ammonium nitrate-N because of the lower solubility of the nitrate component as compared to the solubility of urea. However, it has now been discovered in the investigations leading to the instant invention that when urea is added along with the conventional urea-ammonium nitrate solution (32 percent nitrogen) as the starting material, quite unexpectedly, the resulting solution can contain a TPN ($N+P_2O_5+K_2O$) of 35 percent or more at 0° C. by increasing the phosphoric acid input along with the increased input of urea.

Accordingly, it has now been found that a novel method can be utilized to produce high-analysis acidic-type fertilizer solutions by reacting urea-ammonium nitrate solutions with phosphoric acid and urea to provide a desirable wide range of urea-N to ammonium nitrate-N weight ratios of 15 to 4.

The chemical mechanisms effected in the practice of the teaching of Achorn, et al., result in the precipitation of $CO(NH_2)_2.HNO_3$ and $NH_4H_2PO_4$, whereas the mechanisms utilized in the practice of the instant invention are quite different from those taught by Achorn, et al. For example, the phosphate utilization in the present invention invites reaction with the ammonium ions derived from the ammonium nitrate to thereby form monoammonium phosphate, while at the same time it reacts with the urea constituent to form a resulting urea phosphoric acid adduct compound at relatively moderate phosphate concentrations.

SUMMARY OF THE INVENTION

The unique feature or gist underlying the basic concept or mechanism of the present invention is that, through its application, high-analysis solution-type fertilizers stable at 0° C. can be produced over a predetermined range of ratios of both urea to ammonium nitrate and of $P_2O_5$ to total nitrogen.

Agronomic tests have shown that all these component compounds have characteristics that are desirable to ensure good plant growth. Tests with fertilizer solutions produced according to the teachings of the instant invention indicate that foliage damage is not a problem and that there is little loss of ammonia when they are surface applied. In addition, they exhibit less tendency to cause germination damage than do some fertilizers containing urea at a higher pH value. Therefore, in using solutions produced by the instant invention, any resulting decomposition, of the urea to ammonia, is not deterimental since the reaction product, to wit, ammonia, combines with the phosphoric acid portion of the solution to form monoammonium phosphate thereby minimizing nitrogen loss as ammonia. Accordingly, foliage is not damaged, and seeds are not adversely affected by contact or juxtaposition with ammonia.

Urea-ammonium nitrate (UAN) solution has been selected as the most preferred source of a portion of the nitrogen in the practice of the instant invention. The flexibility of this process is further enhanced by at least the following three principal considerations: (1) the 32 percent $CO(NH_2)_2$—$NH_4NO_3$ solution is a commercially acceptable, standardized nitrogen fertilizer which most farmers in the United States prefer to use in preference to urea only; (2) fluid fertilizers are used because they are easier to handle and are dust free as compared to solid materials; and (3) if considerations of economy or availability dictate, solid urea or ammonium nitrate can be substituted and utilized as the principal source of nitrogen in place of such 32 percent UAN solution.

The practice of the instant invention is principally concerned with the production of high-analysis solution-type fertilizers of low pH. They are preferably produced by the reaction of phosphoric acid with commercially available nitrogen solution which has about 32 percent nitrogen and a weight ratio of urea to ammonium nitrate of about 1. Additional urea is added, depending on the amount of phosphoric acid input, so that the resulting liquid product contains at least 34 percent and preferably 35 percent TPN in solution for substantial periods of time at 0° C., and the weight ratio of urea-N to ammonium nitrate-N varies from 2.423 to a large number, but this side of infinity, i.e., almost all urea and almost no ammonium nitrate-N. Note: The other portion of the 34 percent island (shown in FIG. 1), e.g., wherein the $P_2O_5$ percent is less than about 10 percent (dry basis), is abandoned for purposes of this invention and these discussions since that zone is considered too restrictive in relation to ease of working within the parameters at or near the 34 and 35 percent TPN "islands". Typical high-analysis NP fertilizer solutions produced by the instant invention are 27-8-0, 30-4-0, 29-6-0, 26-9-0, 24-12-0 and 25-10-0.

OBJECTS OF THE INVENTION

While the principal objects of the present invention relate to securing clear liquid-fertilizer solutions at 0° C. according to the acceptance by the fertilizer industry and users of standards for solutions stable at this temperature (required for year round shipment and storage in northern latitudes of the United States), it is to be fully understood, without presenting the data, that the "35 percent TPN Island" as well as other "Islands" will expand with increasing temperatures and solutions with even higher analysis can be obtained at such higher temperatures. These more concentrated compositions are not being abandoned since one trained in phase diagram chemistry for highly soluble solutes can readily perceive and produce higher analyses solutions utilizing the fundamental information presented in Table III, infra.

A first principal object of the instant invention is to develop means and methods for producing high-analysis (about 35 percent TPN) solution-type fertilizers which contain both N and P from commercial urea-ammonium nitrate solutions (32 percent nitrogen), urea, and commercial wet-process phosphoric acid. These solutions may contain from 4 to 12 percent $P_2O_5$, 58.5 to 61.5 percent urea-N, and 4 to 16 percent $NH_4NO_3$—N and the weight ratio of urea to ammonium nitrate-N may vary from 3.75 to 15.25 (moles of urea to moles of ammonium nitrate of 2.81 to 11.44). In the preferred embodiment, the TPN content for the higher analysis clear liquid fertilizers is from about 35 to almost 36 percent at 0° C.

A second principal object of the present invention is to develop means and methods for producing high-analysis (about 34 or more percent TPN) solution-type fertilizers which contain both N and P from commercial urea-ammonium nitrate solutions (32 percent nitrogen), urea, and commercial wet-process phosphoric acid. These solutions may contain from 4 to 12 percent $P_2O_5$, 18.9 to 21.9 percent urea-N, and $1 \times 10^{-6}$ to 8.8 percent $NH_4NO_3$—N and the weight ratio of urea-N to ammonium nitrate-N may theoretically vary from 2.42 to infinity (moles of urea to moles of ammonium nitrate of 1.82 to infinity. As noted elsewhere, for purposes of describing and claiming the instant invention, we intend to teach and relate to a three-phase system. Therefore, we have arbitrarily set the upper limit at $1 \times 10^6$ rather than at infinity. In this desired embodiment, the TPN content for the higher analysis clear liquid fertilizers is about 34 to almost 35 percent at 0° C.

A third principal object of the present invention is to develop such methods for producing solution-type fertilizers from low-cost, commercially available fertilizer materials such as urea, ammonium nitrate, standard UAN solution, and phosphoric acid or by-product urea.phosphoric acid adduct.

Another object of the present invention is to effect production of solution-type fertilizers containing both urea-N and ammonium nitrate-N, both of which have desirable properties for obtaining the desired plant response.

A further object of the instant invention is to demonstrate and establish that low pH fertilizers of the type herein described will not cause germination damage when mixed with soil at the time of seeding and also will not damage foliage when applied directly to the growing plant.

These objects, as well as other objects and advantages of the instant invention, are summarized below:

1. Produce a low pH liquid that will not cause germination damage, burn foliage, or allow vapor losses of ammonia.
2. Produce a solution-type fertilizer that has at least 34 percent TPN at 0° C.
3. Use as feedstock the same commercially available low-cost materials such as urea, ammonium nitrate, nitrogen solution, and wet-process type phosphoric acid that are currently and usually used to produce solution-type fertilizers or urea.phosphoric acid adduct from acid purification processes.
4. Produce fertilizer solutions which contain a wide range of urea to ammonium nitrate weight ratios, for example, 2.4 to infinity.
5. Produce low pH solution-type fertilizers in readily available and inexpensive mixing equipment.
6. Produce low-cost solution-type fertilizers that can either be easily injected beneath the soil or applied directly onto the surface thereof.

DESCRIPTION OF THE DRAWINGS

The present invention, together with its desired objects and further advantages thereof, will be better understood from a consideration of the following description taken in connection with the accompanying drawings in which.

As used herein, an "effective limit" is an amount of ammonium nitrate-N in the three-component system, $P_2O_5$, urea, and ammonium nitrate so small, relative to the amount of urea-N in said three-component system so as to contribute substantially no nitrogen values to the total nitrogen therein and still be capable of maintaining the three-component status of said system. In other words, such effective limit represents and means only an amount of ammonium nitrate-N capable of keeping such system from being rendered a two-component system (urea-$P_2O_5$) and yet substantially noncontributing to the total nitrogen value thereof.

In order to more clearly illustrate the specific and important aspects of the instant invention and to provide the reader with a more convenient and concise description thereof in a fashion or mode which lends continuity to such presentation, portions of the descriptions or disclosures shown or illustrated in FIGS. 1–4 are included in the section below entitled "Description Of The Preferred Embodiments."

Figure 1:
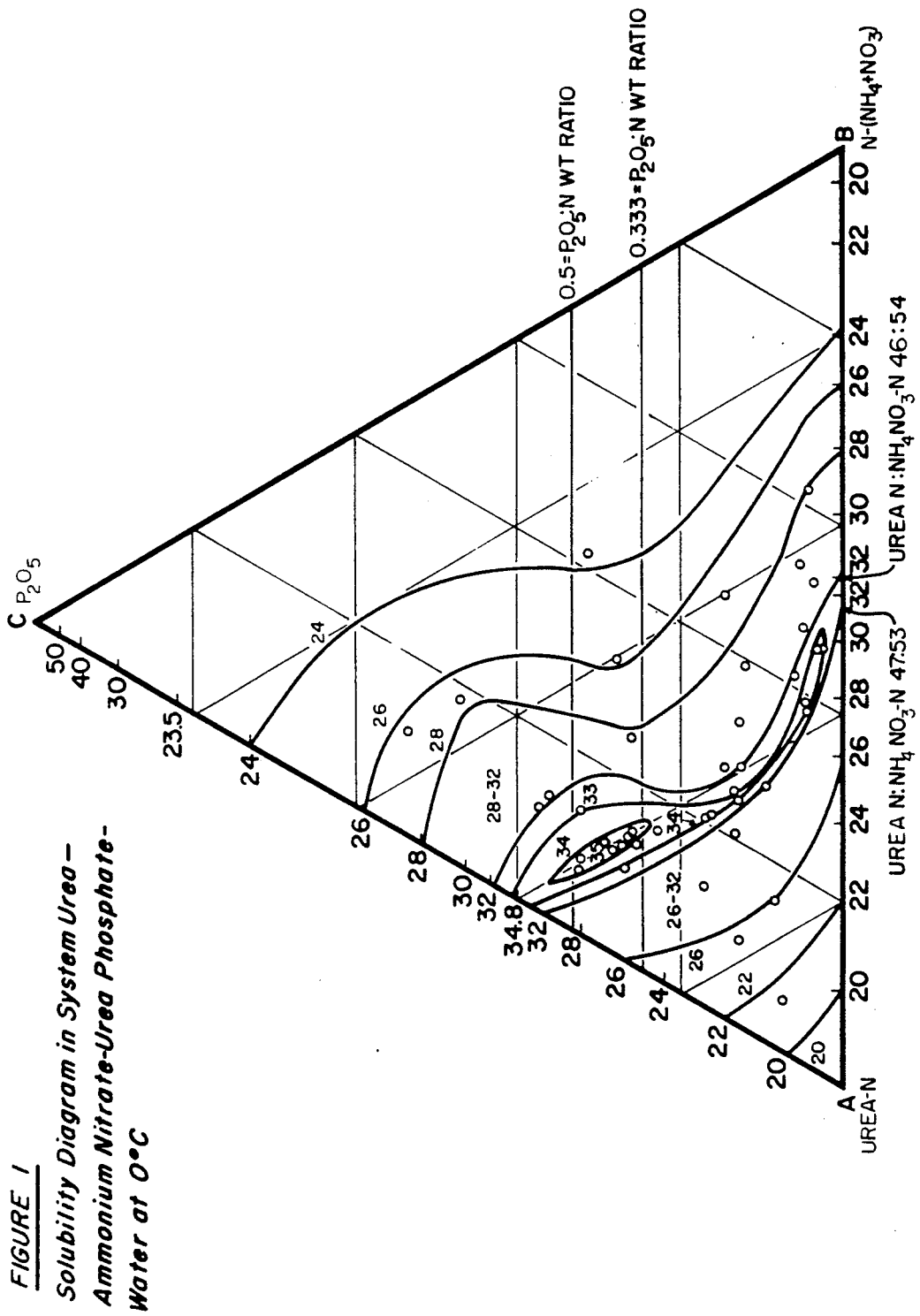
FIG. 1 represents a graphical illustration of a four-component solubility diagram for the system urea, ammonium nitrate, phosphoric acid, and water projected onto the three-component face of urea, ammonium nitrate, and phosphoric acid at 0° C. The weight percent of urea-N, ammonium nitrate-N, and $P_2O_5$ are plotted on a water-free basis. The isoconcentration lines are expressed as total plant nutrient (TPN) content (% N + % $P_2O_5$) as obtained from the four-component chemical analysis data (see Table III, infra). This method of presenting the data will automatically define the areas of highest plant nutrient content and as shown will limit their size to a finite value.

Referring now more specifically to FIG. 1, it may be appreciated that point A therefore represents the urea-N concentration on a water-free basis when only urea is present in solution. Similarly, point B therefore represents ammonium nitrate-N concentration, and point C therefore represents phosphate as $P_2O_5$ concentration in water, respectively. The line between points A and B therefore represents total nitrogen solubility when a specific ratio of urea to ammonium nitrate is present in solution. The ratio is expressed by the ratio of the two distances, a point expressed as percent B divided by percent A at a specific point, as shown by the coordinates on the graph which are the chemical analysis calculated on a water-free basis. For example, the total nitrogen solubility in the system urea-$NH_4NO_3$—$H_2O$ as reported by V. A. Sokolov [J. Gen. Chem. (USSR) 9, 753–8 (1939)] is obtained on line A—B in FIG. 1. As can be seen, the standard 32 percent N solution can be obtained at a very small range of urea to ammonium nitrate ratios. This range is calculated to be from a weight ratio of urea-N to ammonium nitrate-N of 0.852 to 0.887 (units of urea-N to units of ammonium nitrate-N in the range from 46:54 to 47:53). Even with this narrow range, fertilizer producers can maintain quality control to consistently produce a standard 32 percent N fertilizer.

Likewise, the TPN content ($P_2O_5$+urea-N) on the A—C line was determined from the phase system data reported by N. N. Nurakhmetov, B. A. Beremzhanov, and K. G. Khanapin [J. App. Chem. (USSR) 46, 2557–2559 (1973)] and show that the maximum plant nutrient content (with the exception of almost pure phosphoric acid) at 0° C. for the invariant point where both urea and urea-$H_3PO_4$ are at equilibrium is 34.8 percent. As the solution composition moves from this point, the TPN rapidly drops to 32 percent or less as shown in FIG. 1. For example, a TPN ($P_2O_5$ plus urea-nitrogen) solubility of 32 percent or higher is obtained on line A—C when the $P_2O_5$ to urea-nitrogen weight ratio is from 0.67 to 0.54 (units of $P_2O_5$ to units of urea-nitrogen, on a weight basis, ranging from 40:60 to 35:65) which corresponds to solutions of fertilizer grades 20.8-11.2-0 to 19.2-12.8-0, also have been alluded to by several earlier researchers. Utilizing the data from Table III, infra, the instant investigators have found an unexpected large area where the TPN in solutions at 0° C. are higher than any reported points and it can be made by maintaining the proper ratio of the three fertilizer compounds. This unexpected high-analysis "35 percent TPN Island" in FIG. 1 is exhibited by plotting the isoconcentration lines, i.e., the data in Table III labeled TPN.

Figure 3:
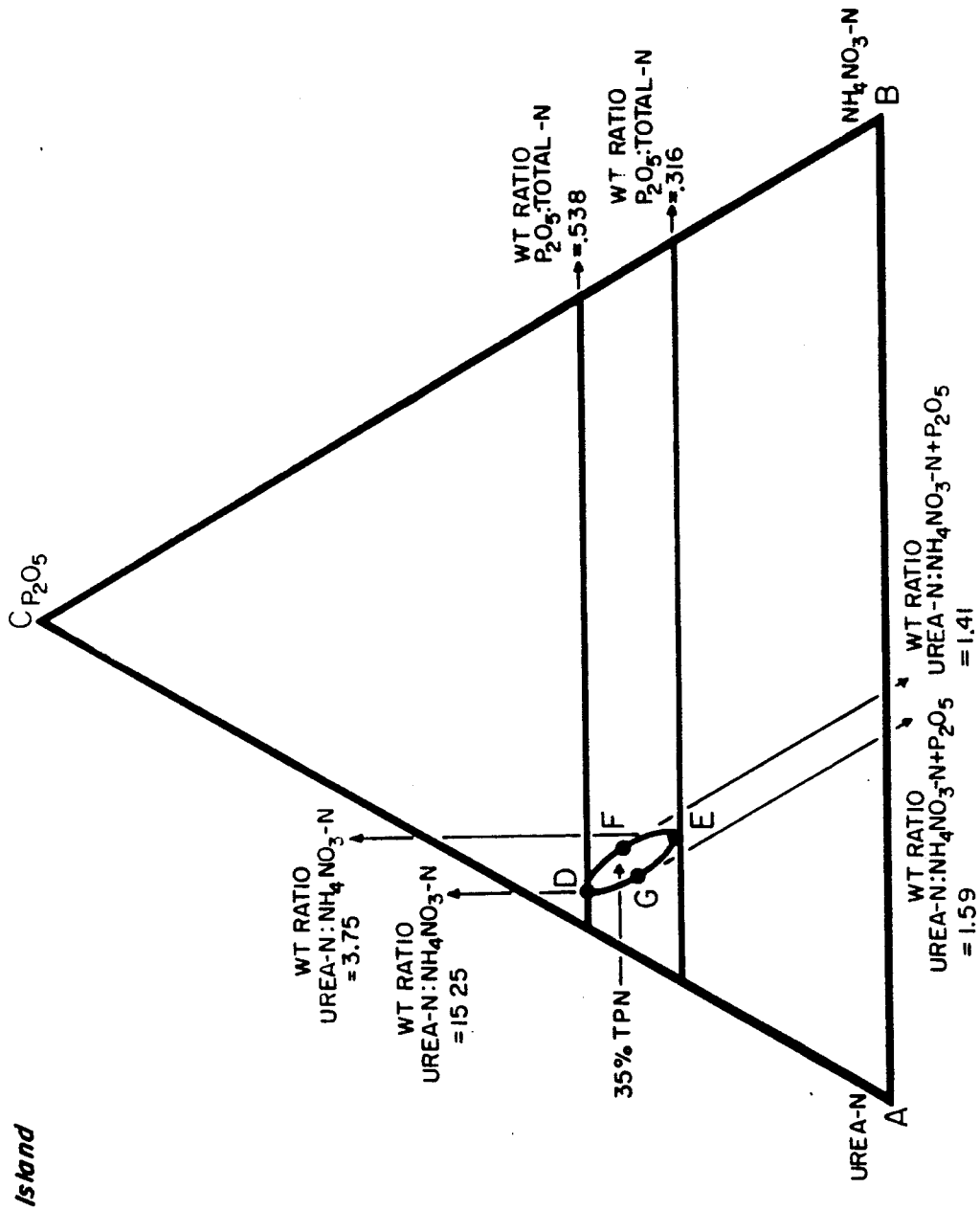
FIG. 3 defines a specific portion of the graphical illustration of the solubility diagram shown in FIG. 1, supra, illustrating that the limits for the "35 percent TPN Island" are between a weight ratio (a) $P_2O_5$: total-N of 0.538 to 0.316, (b) urea-N:ammonium nitrate-N of 15.25 to 3.75, and (c) urea-N to ammonium nitrate-N plus $P_2O_5$ of 1.41 to 1.59.

Referring now more specifically to FIG. 3 wherein is depicted the 35 percent TPN Island, the chemical composition on a dry basis for points D, E, F, and G shown thereon are as illustrated in Table I, below.

TABLE I

| | 35% TPN Island Chemical Composition, Dry Basis | | | | | |
|---|---|---|---|---|---|---|
| Exp No | Urea-N | $NH_4NO_3$—N | $P_2O_5$ | Total N | Urea N:$NH_4NO_3$—N | Urea-N / $NH_4NO_3$—N + $P_2O_5$ |
| D | 61.0 | 4.0 | 35.0 | 65.0 | 15.25 | 1.56 |
| E | 60.0 | 16.0 | 24.0 | 76.0 | 3.75 | 1.50 |
| F | 58.5 | 11.5 | 30.0 | 70.0 | 5.09 | 1.41 |
| G | 61.5 | 9.5 | 29.0 | 71.0 | 6.47 | 1.59 |
| Actual Solution Analyses, Weight % | | | | | | |
| D | 21.35 | 1.40 | 12.25 | | | |
| E | 21.00 | 5.60 | 8.40 | | | |
| F | 20.48 | 4.03 | 10.50 | | | |
| G | 21.53 | 3.33 | 10.15 | | | |

Figure 4:
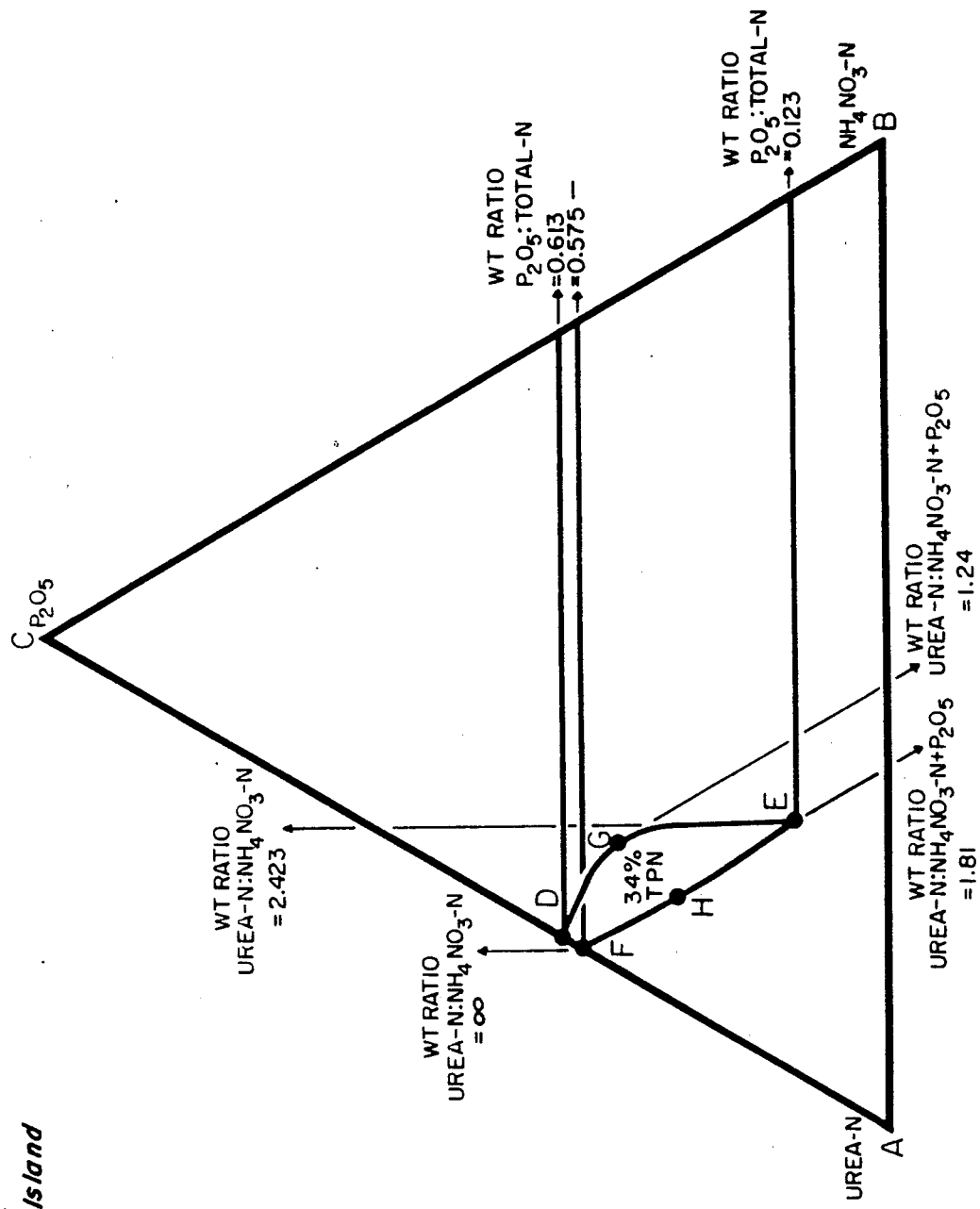
FIG. 4 defines a specific portion of the graphical illustration of the solubility diagram shown in FIG. 1, supra, illustrating that the theoretical limits for the "34 percent TPN Island" are between a weight ratio of $P_2O_5$ to total N of 0.613 or 0.575 to 0.124 and a weight ratio of urea-N to ammonium nitrate-N of 2.423 to infinity (i.e., all urea-N). From a practical standpoint, the effective limits for the "34 percent TPN Island" are between a $P_2O_5$ to total N weight ratio of 0.613 to 0.124 and a weight ratio of urea-N to ammonium nitrate-N of 2.423 to $1 \times 10^6$. As is also shown, the weight ratio of urea-N to ammonium nitrate-N plus $P_2O_5$ ranges between about 1.24 to about 1.81.

Referring now more specifically to FIG. 4 wherein is depicted the 34 percent TPN Island, the chemical composition on a dry basis for points D, E, F, G, and H shown thereon are as illustrated in Table II, below. Also shown, as in Table I above, are the actual solution analyses on a weight percent.

TABLE II

| | 34% TPN Island Chemical Composition, Dry Basis | | | | | |
|---|---|---|---|---|---|---|
| Exp No | Urea-N | $NH_4NO_3$—N | $P_2O_5$ | Urea N:$NH_4NO_3$—N | $P_2O_5$/ Total N | Urea-N / $NH_4NO_3$—N + $P_2O_5$ |
| D | 62.0 | 0 | 38.0 | — | 0.613 | 1.63 |
| E | 63.0 | 26.0 | 11.0 | 2.423 | 0.124 | 1.70 |
| F | 63.5 | 0 | 36.5 | — | 0.575 | |
| G | 55.5 | 14.0 | 30.5 | 3.938 | 0.439 | 1.24 |
| H | 64.5 | 12.0 | 23.5 | 5.341 | 0.308 | 1.81 |
| Actual Solution Analyses, Weight % | | | | | | |
| D | 21.1 | 0 | 12.9 | | | |

TABLE II-continued

| | | 34% TPN Island Chemical Composition, Dry Basis | | | |
|---|---|---|---|---|---|
| Exp No | Urea-N | $NH_4NO_3$—N | $P_2O_5$ | Urea N:$NH_4NO_3$—N | $P_2O_5$/Total N | Urea-N $NH_4NO_3$—N + $P_2O_5$ |
| E | 21.4 | 8.8 | 3.7 | | |
| F | 21.6 | 0 | 12.4 | | |
| G | 18.9 | 4.8 | 10.4 | | |
| H | 21.9 | 4.1 | 8.0 | | |

DESCRIPTION OF THE PREFERRED EMBODIMENTS

The chemical analyses of numerous 0° C. solutions were determined (see Table III, below) and plotted in FIG. 1. As noted, supra, the weight percent of urea-N, ammonium nitrate-N, and $P_2O_5$ are plotted on a water-free basis, and the solutions are expressed as total plant nutrient (TPN) content (% N + % $P_2O_5$) and the iso-concentration lines are derived.

TABLE III

Solubility Study in U-AN-UP-$H_2O$

| No. | pH | $NH_4$—N | $NO_3$—N | Urea-N | $P_2O_5$ | TPN | $NH_4NO_3$—N | Urea-N | $P_2O_5$ | Solid |
|---|---|---|---|---|---|---|---|---|---|---|
| 1A | 2.16 | 7.62 | 8.00 | 18.70 | 0.91 | 35.23 | 44.34 | 53.08 | 2.58 | UN, MAP, U |
| 2A | 2.00 | 6.15 | 6.60 | 19.90 | 1.68 | 34.33 | 37.14 | 57.97 | 4.89 | UN, MAP, U |
| 3A | 1.88 | 6.46 | 6.90 | 17.10 | 1.83 | 32.29 | 41.38 | 52.96 | 5.67 | UN, MAP |
| 4A | 1.77 | 4.81 | 5.10 | 16.90 | 3.95 | 30.76 | 32.22 | 54.94 | 12.84 | UN, MAP |
| 5A | 1.98 | 4.79 | 5.40 | 20.70 | 3.04 | 33.93 | 30.03 | 61.01 | 8.96 | UN, MAP |
| 6A | 1.85 | 7.31 | 7.70 | 15.50 | 1.41 | 31.92 | 47.02 | 48.56 | 4.42 | UN, MAP |
| 8A | 1.95 | 7.89 | 8.50 | 13.90 | 1.05 | 31.34 | 52.30 | 44.35 | 3.35 | UN, MAP |
| 9A | 2.02 | 7.68 | 8.00 | 16.70 | 1.08 | 33.46 | 46.86 | 49.91 | 3.23 | UN, MAP |
| 10A | 2.27 | 4.43 | 4.60 | 20.70 | 3.00 | 32.73 | 27.59 | 63.24 | 9.17 | MAP, U |
| 11A | 1.99 | 3.35 | 3.80 | 21.70 | 5.57 | 34.42 | 20.77 | 63.04 | 16.18 | MAP, U |
| 12A | 1.89 | 3.81 | 4.40 | 21.70 | 4.43 | 34.34 | 23.91 | 63.19 | 12.90 | UN, MAP, U |
| 13A | 1.75 | 3.93 | 4.40 | 20.90 | 4.56 | 33.79 | 24.65 | 61.85 | 13.50 | UN, MAP |
| 14A | 1.62 | 5.50 | 5.90 | 14.20 | 3.37 | 28.97 | 39.35 | 49.02 | 11.63 | UN, MAP |
| 15A | 1.72 | 7.86 | 8.10 | 12.50 | 1.37 | 29.83 | 53.50 | 41.90 | 4.59 | UN, MAP |
| 16A | 1.83 | 8.82 | 9.10 | 9.93 | 1.19 | 29.04 | 61.71 | 34.19 | 4.10 | UN, MAP, AN |
| 17A | 1.37 | 4.87 | 4.50 | 6.31 | 6.97 | 22.65 | 41.37 | 27.86 | 30.77 | UN, MAP |
| 18A | 1.48 | 4.11 | 3.90 | 10.50 | 6.81 | 25.32 | 31.64 | 41.47 | 26.90 | UN, MAP |
| 19A | 1.61 | 3.57 | 3.40 | 13.80 | 7.18 | 27.95 | 24.94 | 49.37 | 25.69 | UN, MAP |
| 20A | 1.79 | 3.18 | 3.20 | 18.70 | 6.42 | 31.50 | 20.25 | 59.37 | 20.38 | UN, MAP |
| 21 | 2.12 | 1.92 | 1.90 | 20.10 | 4.89 | 28.81 | 13.26 | 69.77 | 16.97 | MAP,U |
| 22A | 2.30 | 1.28 | 1.20 | 20.10 | 3.11 | 25.69 | 9.65 | 78.24 | 12.11 | U |
| 23A | 2.47 | 0.65 | 0.61 | 19.70 | 1.61 | 22.57 | 5.58 | 87.28 | 7.13 | U |
| 24A | 1.45 | 7.85 | 7.90 | 5.68 | 2.05 | 23.48 | 67.08 | 24.19 | 8.73 | UN, MAP |
| 25A | 1.51 | 5.70 | 5.50 | 9.94 | 3.79 | 24.93 | 44.93 | 39.87 | 15.20 | UN, MAP |
| 26A | 1.81 | 3.86 | 4.00 | 17.40 | 3.89 | 29.15 | 26.96 | 59.69 | 13.34 | UN, MAP |
| 27A | 2.23 | 3.06 | 2.90 | 20.00 | 3.92 | 29.88 | 19.95 | 66.93 | 13.12 | U |
| 28A | 2.42 | 2.10 | 2.10 | 19.90 | 2.06 | 26.16 | 16.06 | 76.07 | 7.87 | U |
| 29A | 1.30 | 2.80 | 2.10 | 9.83 | 12.70 | 27.43 | 17.86 | 35.84 | 46.30 | UN, MAP |
| 30A | 1.25 | 1.90 | 1.40 | 10.00 | 14.80 | 28.10 | 11.74 | 35.59 | 52.67 | UN, UP |
| 31A | 1.50 | 1.84 | 1.80 | 15.90 | 11.70 | 31.24 | 11.65 | 50.90 | 37.45 | UN, MAP, UP |
| 32 | 1.82 | 1.95 | 2.10 | 20.90 | 10.40 | 35.35 | 11.46 | 59.12 | 29.42 | UP, U |
| 17B | | 6.62 | 6.69 | 15.90 | 1.57 | 30.78 | 43.24 | 51.66 | 5.10 | UN, MAP |
| 18B | | 2.32 | 2.17 | 18.90 | 10.90 | 34.29 | 13.09 | 55.12 | 31.79 | UN, MAP, UP |
| 19B | | 2.82 | 3.07 | 21.00 | 6.64 | 33.53 | 17.57 | 62.63 | 19.80 | UN, MAP, U |
| 20B | | 2.54 | 2.74 | 21.10 | 7.70 | 34.08 | 15.49 | 61.91 | 22.59 | UN, MAP, U |
| 21B | | 8.15 | 8.30 | 12.40 | 1.29 | 30.14 | 54.58 | 41.14 | 4.28 | UN, MAP, AN |
| 22B | | 1.79 | 1.82 | 20.90 | 10.90 | 35.41 | 10.19 | 59.02 | 30.78 | UP |
| 23B | | 7.71 | 7.68 | 12.00 | 1.46 | 28.85 | 53.34 | 41.59 | 5.06 | UN, MAP, AN |
| 24B | | 3.83 | 3.09 | 9.19 | 10.60 | 26.71 | 25.91 | 34.41 | 39.69 | UN, MAP |
| 25B | | 2.28 | 2.50 | 21.30 | 9.41 | 35.49 | 13.47 | 60.02 | 26.51 | UN, MAP, U, UP |
| 26B | | 6.40 | 6.60 | 18.70 | 1.57 | 33.27 | 39.07 | 56.21 | 4.72 | UN, MAP, U |
| 27B | | 4.28 | 4.60 | 18.50 | 3.92 | 31.30 | 28.37 | 59.11 | 12.52 | UN, MAP |
| 30B | | 1.16 | 1.19 | 21.70 | 11.70 | 35.75 | 6.57 | 60.70 | 32.73 | U |
| 31B | | 1.34 | 1.34 | 21.40 | 11.80 | 35.88 | 7.47 | 59.64 | 32.89 | U |
| 32B | | 4.40 | 4.70 | 19.40 | 3.46 | 31.96 | 28.47 | 60.70 | 10.83 | UN, MAP |
| 17C | 2.06 | 6.26 | 6.50 | 18.20 | 1.48 | 32.44 | 39.33 | 56.10 | 4.56 | UN, MAP |
| 18C | 1.75 | 2.18 | 2.20 | 20.90 | 9.81 | 35.09 | 12.48 | 59.56 | 27.96 | UN, MAP, UP |
| 19C | 1.89 | 3.53 | 3.90 | 20.30 | 4.72 | 32.45 | 22.90 | 62.56 | 14.55 | UN, MAP |
| 20C | 1.88 | 3.26 | 3.50 | 20.70 | 5.48 | 32.94 | 20.52 | 62.84 | 16.64 | UN, MAP, U |
| 21C | 2.09 | 7.93 | 8.20 | 14.20 | 1.03 | 31.36 | 51.43 | 45.28 | 3.28 | UN, MAP |
| 22C | 1.84 | 2.12 | 2.20 | 21.10 | 9.93 | 35.35 | 12.22 | 59.69 | 28.09 | UN, MAP, UP |
| 23C | 2.02 | 7.66 | 7.60 | 13.00 | 1.42 | 29.50 | 51.73 | 44.07 | 4.20 | UN, MAP |
| 24C | 1.50 | 2.51 | 2.10 | 16.40 | 11.90 | 32.91 | 14.01 | 49.83 | 36.16 | UN, MAP |
| 25C | 1.80 | 3.20 | 3.50 | 20.60 | 5.62 | 32.92 | 20.35 | 62.58 | 17.07 | UN, MAP |
| 26C | 2.19 | 6.66 | 6.90 | 18.40 | 1.17 | 33.13 | 40.93 | 55.54 | 3.53 | UN, MAP, U |
| 27C | 2.01 | 5.00 | 5.40 | 19.70 | 2.50 | 32.60 | 31.90 | 60.43 | 7.67 | UN, MAP |
| 28C | 1.80 | 2.12 | 2.20 | 21.00 | 9.92 | 35.24 | 12.26 | 59.59 | 28.15 | UN, MAP, U |
| 31C | 1.89 | 2.19 | 2.30 | 21.40 | 9.52 | 35.41 | 12.68 | 60.43 | 26.89 | UN, MAP |

TABLE III-continued

Solubility Study in U-AN-UP-$H_2O$

| | | | | | | | Distrubution of total plant nutrient | | | |
|---|---|---|---|---|---|---|---|---|---|---|
| No. | pH | $NH_4$—N | $NO_3$—N | Urea-N | $P_2O_5$ | TPN | $NH_4NO_3$—N | Urea-N | $P_2O_5$ | Solid |
| 32C | 1.99 | 5.31 | 5.30 | 19.60 | 2.22 | 32.43 | 32.72 | 60.44 | 6.85 | UN, MAP, U |

The changing ratios of both urea-N to $NH_4NO_3$—N and $P_2O_5$ to total-N is reflected in two different characteristics of the data. One is the oblong shape of the 35 percent isoconcentration curve in FIG. 1, supra, and the extensive range of the isoconcentration lines below 35 percent TPN which extend across the total field from the urea-$P_2O_5$ side of the graph almost to the urea-ammonium nitrate side. The other shows that the changing ratios cause a wide variation in the composition of the solid phases that form when the solutions are cooled below 0° C. Several instances are presented in the examples below which show that the saturating solid phase composition varies between four different solids. These saturating solids are urea, urea.$H_3PO_4$, urea.$HNO_3$, and $NH_4H_2PO_4$, as identified by optical microscopy. Theoretically, all four solid compounds are present at one point at 0° C. within the oblong 35 percent TPN curve, and the actual sample, No. 25B (Table III, supra), contains about 35.9 percent TPN (total N+$P_2O_5$). This is near the highest plant nutrient content that can be obtained for a clear solution at 0° C. However, its compositional properties are highly restrictive to one point and will result in precipitation of one or more of the solid phases if the composition is varied only slightly. Thus, the teachings of the present invention indicate that a TPN content of about 35 percent or slightly higher is practical as a result of the wider variation in compositions that will produce a stable solution at 0° C.

The solutions can be produced in simple-type mixing equipment including a batch mix tank mounted on scales so that the individual materials can be weighed. Although there are some reactions between the components of urea, urea-ammonium nitrate and $H_3PO_4$ to produce $NH_4H_2PO_4$, urea-$H_3PO_4$, or urea-$HNO_3$, external cooling or heating is not required because of the small heat of interaction that is involved, i.e., solid precipitants are not produced.

Solutions produced from these input compounds, having lower plant nutrient content, i.e., 24 to 32 percent TPN, can be produced over a very wide range of urea-N to $NH_4NO_3$—N at $P_2O_5$ values from 0 to 75 percent on a dry basis as shown in FIG. 1, supra. This is in contrast to the more confined ratios required for the desirable or preferred TPN values above 35 percent as described above.

For example, 32 percent TPN solution fertilizers at 0° C. can be produced with a wide variation of $P_2O_5$ to N weight ratios of 0.001 to 0.7 and urea-N to ammonium nitrate-N weight ratios of infinity to 1. An even wider range is provided for the production of 28 percent TPN solution fertilizer as shown in FIG. 1, supra.

Figure 2:
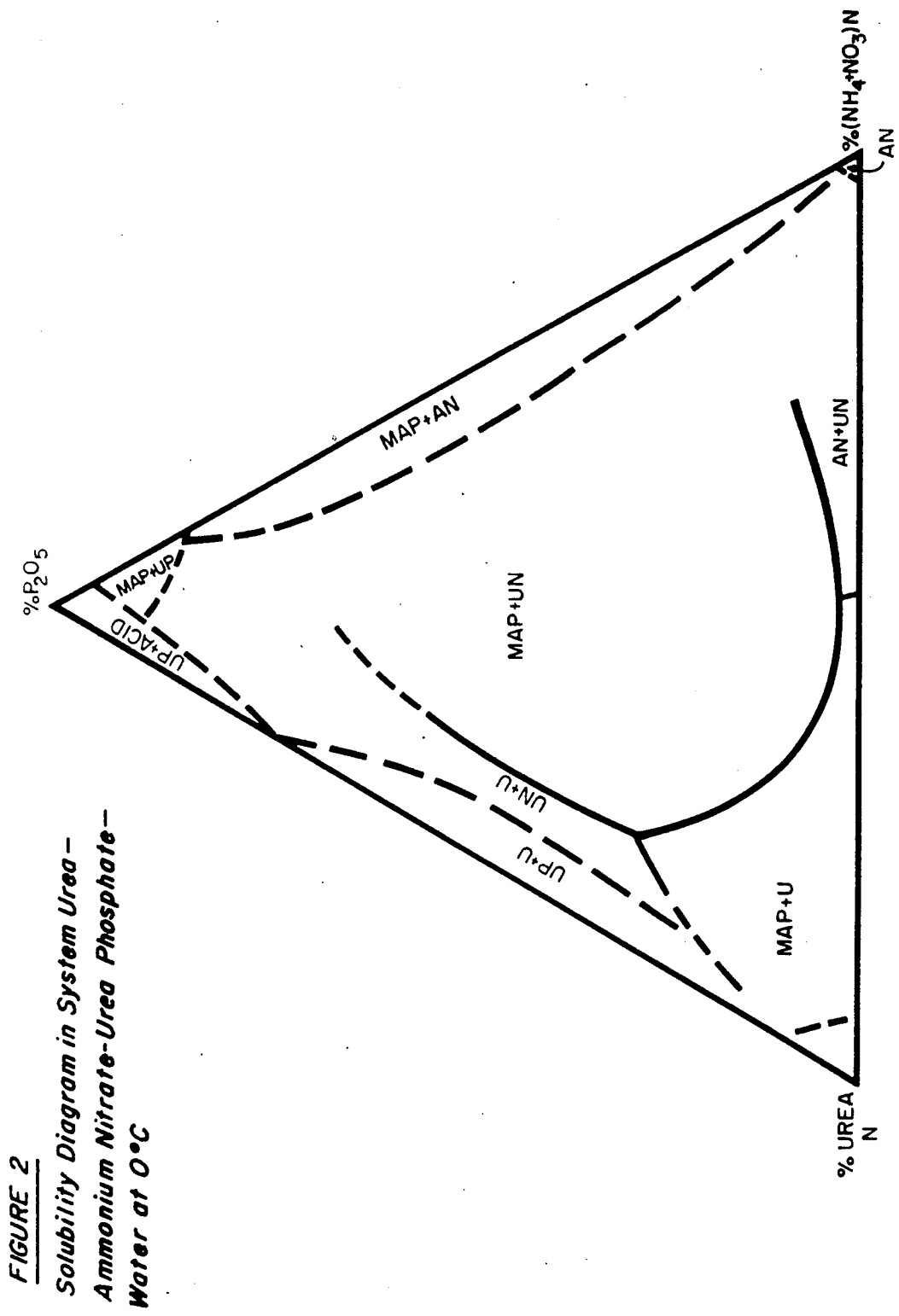
FIG. 2 represents the data which was used to plot FIG. 1, supra, but presented in a fashion typically utilized in the prior art, to which the instant invention relates, to highlight and illustrate the significant limitations and restrictions of this type of method for defining or even locating the relatively small zones which are of primary interest in the instant invention. This type of figure is normally utilized to define the various relationships and stability field limitations for the equilibrating solid phases. Thus, the areas of low TPN were not sufficiently defined by the limited data obtained for this study and are consequently indicated by dashed lines.

In order to demonstrate that one skilled in the art of phase diagram chemistry would not have an obvious inclination to analyze the data in the manner which provided the instant discovery, such data have been plotted and presented in a fashion typical to that generally utilized to display these type of data. This presentation is shown in FIG. 2, supra, from the data in Table III, supra. For one trained and skilled in this art, it is obvious that a very insufficient quantity of data is available even to describe the small zones wherein the instant unusual solution compositions were encountered. While the instant data are sufficient to define the "35 percent TPN Island" as shown in FIG. 1, supra, it is only capable of defining a small area of the four stability fields in the phase system $CO(NH_2)_2$—$(NH_4)_4O$—$N_2O_5$—$P_2O_5$—$H_2O$ at 0° C., and can only provide a conjecture for the position of the other fields.

Also, as shown in FIG. 2, supra, the TPN content cannot be ascertained from this type of diagram even though the general areas of equilibrium compositions and tentative placement of the saturation isotherms can be made. These placements are the primary goal of phase chemistry studies as practiced by experienced scientists. As those trained and experienced in this art appreciate, the determination of a five-component phase system is an extremely difficult task. Although conduct of the present study was very complicated, it was greatly simplified because in these investigations we were able to maintain the $NH_4$—N to $NO_3$—N at a ratio very close to 1 in order to apply the results to acceptable standard 32 percent nitrogen fertilizer materials. It was in this manner wherein were obtained the exact data necessary to describe the "35 percent TPN Island" as well as the extremities for the 32 percent and 34 percent TPN restrictions. In fact, only a few points were obtained to evaluate the isoconcentration isotherms below 30 percent TPN (see Table III, supra) since these concentrations can be readily obtained by diluting the 30 percent to 35 percent TPN liquids obtained by the teachings of this discovery.

As shown in FIG. 3, supra, the limits of the "35 percent TPN Island" are between a weight ratio of $P_2O_5$:total N of 0.538 to 0.316 and a weight ratio urea-N:ammonium nitrate-N of 15.25 to 3.75.

Likewise, FIG. 4, supra, shows the compositional limits for the "34 percent TPN Island," to wit, a weight ratio of $P_2O_5$ to total N of 0.613 or 0.575 to 0.123 and a weight ratio of urea-N to ammonium nitrate-N of 2.423 to $1 \times 10^6$ (i.e., almost all urea-N). The calculated solution composition range for the "35 percent TPN Island" is from 20.5 to 21.5 percent urea-N, 1.4 to 5.6 percent $NH_4NO_3$—N, and 8.4 to 12.3 percent $P_2O_5$. The calculated limits for the "34 percent TPN Island" are 18.9 to 21.9 percent urea-N, 3.7 to 12.9 percent $P_2O_5$, and $1 \times 10^{-6}$ to 8.8 percent $NH_4NO_3$—N.

The TPN values above 32 percent are limited by the following solution compositions and the area in FIG. 1, supra, enclosing the 32 percent isoconcentration curves which extend from 0 percent $NH_4NO_3$—N to 0 percent $P_2O_5$. The limiting solution concentrations at these extremities are shown in Table IV, infra:

TABLE IV

| Urea-N | $NH_4NO_3$—N | $P_2O_5$ |
|---|---|---|
| 19.2 | 0 | 12.8 |
| 20.8 | 0 | 11.2 |
| 15.0 | 17.0 | 0 |

TABLE IV-continued

| Urea-N | NH$_4$NO$_3$—N | P$_2$O$_5$ |
|---|---|---|
| 14.7 | 17.3 | 0 |

EXAMPLES

In order that those skilled in the art may better understand how the present invention can be practiced, the following examples are given by way of illustration and not necessarily by way of limitation.

EXAMPLE I

In the test comprising this example a 24-12-0 (actually 24.08-11.8-0) grade solution fertilizer (see sample 32B, Table III) at 0° C. was produced by mixing 16.65 kg of nitrogen solution (32 percent nitrogen), 40.16 kg urea, 21.85 kg of wet-process phosphoric acid (54 percent of P$_2$O$_5$), and 21.34 kg of H$_2$O. The resulting solution of 100 kg had a urea-N to ammonium nitrate-N weight ratio of 7.99 and a pH of 1.3. The same solution fertilizer was also made by mixing 45.8 kg of urea, 7.7 kg of ammonium nitrate, 21.9 kg of wet-process phosphoric acid and 24.6 kg of water. The wet-process phosphoric acid contained 54 percent P$_2$O$_5$. When this solution was cooled below 0° C., the precipitate formed was identified as urea. This solution is found at the center of the "35 percent TPN Island" and is slightly more concentrated (35.88 percent TPN) than the invariant point composition indicated by sample 25B in Table III, supra, and is presented to show the highest stable TPN that has been obtained at 0° C. for this type of solution.

This same 24-12-0 solution can likewise be prepared by utilizing the urea.H$_3$PO$_4$ adduct as might be obtained from a phosphoric acid purification process, i.e., by mixing 26.7 kg of urea.H$_3$PO$_4$, 38.6 kg of urea, 7.7 kg of NH$_4$NO$_3$ and 27 kg water.

EXAMPLE II

In this example a 23-11-0 grade solution was produced by adjusting the urea-N to ammonium nitrate-N weight ratio to 4.21. The solution mixture comprised 28 kg of the 32 percent nitrogen solution, 31 kg of urea, 20 kg of wet-process phosphoric acid, and 21 kg of water. The same solution was also made by mixing 41 kg of urea, 13 kg of ammonium nitrate, 20 kg of wet-process phosphoric acid, and 26 kg of water. The pH of this solution was 1.4 and on cooling below 0° C., a mixture of urea nitric acid adduct, urea phosphoric acid adduct, and monoammonium phosphate precipitated.

EXAMPLE III

In this example a 25-10-0 grade solution fertilizer was produced by mixing the following ingredients: 27 kg of the 32 percent N nitrogen solution, 36 kg of urea, 18 kg of wet-process phosphoric acid, and 19 kg of water, or if the nitrogen solution is not available, 45 kg of urea, 12.4 kg of ammonium nitrate, 18 kg of wet-process phosphoric acid, and 23.6 kg of water. The final clear solution at 0° C. had a pH of 1.7 and precipitates a mixture of urea-nitric acid, urea phosphoric acid, and monoammonium phosphate when cooled below 0° C. The weight ratio of urea-N to ammonium nitrate-N is 4.87.

EXAMPLE IV

In this example a 26-9-0 grade solution fertilizer at 35 percent TPN was produced by mixing 30 kg of 32 percent nitrogen solution, 35 kg of urea, 17 kg of wet-process phosphoric acid (53 percent P$_2$O$_5$), and 18 kg of water. This same solution also can be produced by mixing 46 kg of urea, 14 kg of ammonium nitrate, 17 kg of wet-process phosphoric acid, and 23 kg of water. This liquid fertilizer has a pH of 1.7 and the precipitate below 0° C. is a mixture of urea-nitric acid, monoammonium phosphate, and urea. The weight ratio of the solution urea-N to ammonium nitrate-N is 4.38.

EXAMPLE V

In the tests comprising this example a 29-6-0 grade solution-type fertilizer was produced by mixing 45 kg of 32 percent nitrogen solution, 31 kg of urea, 12 kg of wet-process phosphoric acid (53 percent P$_2$O$_5$), and 12 kg of water. This same solution can also be produced by mixing 46 kg of urea, 20.5 kg of ammonium nitrate, 12 kg of wet-process phosphoric acid, and 21.5 kg of water. The solution has a pH of 1.8 and urea-N to ammonium nitrate-N weight ratio is 2.99. The precipitate below 0° C. is a mixture of monoammonium phosphate and urea. This same 29-6-0 grade can be produced by mixing 13.3 kg of urea.H$_3$PO$_4$ adduct, 42.1 kg of urea, 11.2 kg of NH$_4$NO$_3$, and 33.0 kg water.

EXAMPLE VI

In this example a 30-4-0 grade solution-type fertilizer was produced by mixing 52 kg of the nitrogen solution, 28 kg of urea, 8 kg of wet-process phosphoric acid (53 percent P$_2$O$_5$), and 12 kg of water. The same solution can be produced by mixing 46 kg of urea, 24.1 kg of ammonium nitrate, 8 kg of wet-process phosphoric acid, and 21.9 kg of water. This solution has a pH of 1.7 and the urea-N to ammonium nitrate-N weight ratio is 2.55.

EXAMPLE VII

In this example a 27-8-0 grade solution-type fertilizer was produced by mixing 45 kg of urea, 17.14 kg of ammonium nitrate, 14.8 kg of 54 percent P$_2$O$_5$ wet phosphoric acid, and 23 kg of water. This solution has a pH of 1.7 and the urea-N to ammonium nitrate-N is 3.5. The precipitating solids below 0° C. are urea nitric acid adduct and monoammonium phosphate. This same 27-8-0 clear liquid fertilizer can be produced by mixing 45 kg of urea, 17.14 kg of NH$_4$NO$_3$, 10.53 kg of 76 percent P$_2$O$_5$ phosphoric acid and 27.3 kg of water. This same 27-8-0 grade can be produced by mixing 17.74 kg of urea.H$_3$PO$_4$ adduct, 38.25 kg of urea, 17.14 kg of NH$_4$NO$_3$ and 26.87 kg of water.

EXAMPLE VIII

In this example a 24.2-9.9-0 grade solution-type fertilizer, stable at 0° C., was produced by mixing 46.68 kg of urea, 6.86 kg ammonium nitrate, 18.33 kg of 54 percent P$_2$O$_5$ phosphoric acid, and 28.13 kg of water. This solution has a pH of 1.6 and the urea-N to ammonium nitrate-N is 9.08. The precipitating solids below 0° C. are urea.phosphoric acid and urea.

EXAMPLE IX

In this example a 23-12-0 grade solution-type fertilizer stable at 0° C. was produced by mixing 23 kg of 53 percent P$_2$O$_5$ wet-process phosphoric acid, 46 kg urea, 6 kg of 32 percent nitrogen solution, and 25 kg water. The solution has a weight ratio of urea-N to ammonium nitrate-N of 23.26, pH is 1.3 and on cooling below 0° C.

the precipitate was found to be urea and urea phosphoric acid.

EXAMPLE X

In this example a 25-11-0 grade solution-type fertilizer was produced by mixing 21.12 kg UAN solution, 39.08 kg urea, 20.37 kg of 54 percent $P_2O_5$ acid, and 19.43 kg water. The same solution can be produced at pH 1.5 by mixing 9.7 kg ammonium nitrate, 45.3 kg urea, 20.4 kg of phosphoric acid, and 23 kg water. The urea-N to ammonium nitrate-N equals 6.35. This same 25-11-0 clear liquid fertilizer can be produced by mixing 45.3 kg of urea, 9.7 kg of $NH_4NO_3$, 14.47 kg of 76 percent $P_2O_5$ phosphoric acid and 30.5 kg of water.

EXAMPLE XI

In this example a 30-4-0 grade solution fertilizer was produced by mixing 53.3 kg of nitrogen solution, 7.4 kg of 54 percent $P_2O_5$ phosphoric acid, 27.7 kg of urea, and 11.6 kg water. The same solution can be produced by mixing 24.5 kg of ammonium nitrate, 45.9 kg urea, 7.4 kg phosphoric acid, and 22.2 kg water. This fertilizer has a pH of 2.0 and urea-N to ammonium nitrate-N of 2.50.

EXAMPLE XII

In this example a 24.5-10.5-0 grade solution, stable at 0° C., was produced by mixing 43.85 kg of urea, 11.49 kg of $NH_4NO_3$, 19.44 kg of 54 percent $P_2O_5$ phosphoric acid, and 25.22 kg water. This same 24.5-10.5-0 clear liquid fertilizer can be prepared by mixing 24.97 kg of UAN solution, 35.35 kg urea, 19.44 kg of 54 percent $P_2O_5$ acid, and 20.24 kg water.

EXAMPLE XIII

In this example a 24.9-10.2-0 grade solution, stable at 0° C., was produced by mixing 46.19 kg of urea, 9.51 kg of $NH_4NO_3$, 18.89 kg of 54 percent $P_2O_5$ phosphoric acid, and 25.41 kg water. This same 24.9-10.2-0 clear liquid fertilizer can be prepared by mixing 20.68 kg of UAN solution, 39.14 kg urea, 18.89 kg of 54 percent $P_2O_5$ acid, and 21.29 kg water.

EXAMPLE XIV

In this example a 23.7-10.4-0 grade solution, stable at 0° C., was produced by mixing 40.47 kg of urea, 14.12 kg of $NH_4NO_3$, 19.26 kg of 54 percent $P_2O_5$ phosphoric acid, and 26.15 kg water. This same 23.7-10.4-0 clear liquid fertilizer can be prepared by mixing 29.81 kg of UAN solution, 30.32 kg urea, 19.26 kg of 54 percent $P_2O_5$ acid, and 20.61 kg water.

EXAMPLE XV

In this example a 26-8-0 grade solution, stable at 0° C., was produced by mixing 47.11 kg of urea, 11.71 kg of $NH_4NO_3$, 14.81 kg of 54 percent $P_2O_5$ phosphoric acid, and 26.37 kg water. This same 26-8-0 clear liquid fertilizer can be prepared by mixing 25.47 kg of UAN solution, 38.44 kg urea, 14.81 kg of 54 percent $P_2O_5$ acid, and 21.28 kg water.

INVENTION PARAMETERS

After sifting and winnowing through the data, supra, as well as other results and operations of our new, novel, and improved techniques, including methods and means for the effecting thereof, the operating variables, including the acceptable and preferred conditions for carrying out our invention are summarized below:

| Plant Food Source | Composition Range, Wt. % | |
|---|---|---|
| | Operational Limits For 34% TPN | Preferred Limits For 35% TPN |
| $NH_4NO_3$—N | $1 \times 10^{-6}$ to 9 | 1.4 to 5.6 |
| Urea-N | 18.9 to 21.9 | 20.5 to 21.5 |
| $P_2O_5$ | 3.7 to 12.9 | 8.4 to 12.3 |

The operating and preferred limits, above, are those in which the precipitation (salting-out) temperature is less than 0° C. The TPN values can, of course, be dramatically increased when the specifications set for the storage and application temperature of the solution fertilizer are higher than 0° C.

While we have shown and described particular embodiment of our invention, modifications and variations thereof will occur to those skilled in the art, such as substitution of wet-process phosphoric acid and ammonium nitrate with monammonium phosphate, more dilute wet-process phosphoric acid products, urea-nitric acid adduct, and urea phosphoric acid adduct. Likewise, since the fundamental phase system includes ammonia or ammonium hydroxide, phosphoric acid, urea, nitric acid, and water, numerous combinations of these reactants can be utilized to prepare the liquid fertilizers described in this embodiment. We wish it to be understood, therefore, that the appended claims are intended to cover such modifications and variations which are within the true scope and spirit of our invention.

What we claim as new and desire to secure by Letters Patent of the United States is:

1. An improved product resulting from the production of high-analysis fertilizer solutions, said solutions having a total plant nutrient (TPN) content, expressed as the sum of $(N + P_2O_5 + K_2O)$, in the range of about 34 weight percent to about 36 weight percent, a pH ranging between about 1.3 to about 2 and being clear and substantially free, at temperatures as low as about 0° C., of precipitates generated in situ and said solutions consisting essentially of water of formulation in admixture of a urea-nitrogen source, a phosphoric acid $(P_2O_5)$ source, and an ammonium nitrate-nitrogen source; said urea-nitrogen source selected from the group consisting of urea, urea and ammonium nitrate solution (UAN), urea phosphoric acid adduct, and mixtures thereof; said phosphoric acid source selected from the group consisting of urea phosphoric acid adduct, furnace-grade phosphoric acid having a $P_2O_5$ content ranging from about 54 percent to about 76 percent, wet-process phosphoric acid having a $P_2O_5$ content ranging from about 50 to about 76 percent, and mixtures thereof; said ammonium nitrate-nitrogen source selected from the group consisting of ammonium nitrate, UAN, and mixtures thereof; said UAN consisting essentially of about 34 percent by weight urea, about 46 percent by weight ammonium nitrate, and about 20 percent by weight water, and said UAN having a urea-nitrogen to ammonium nitrate-nitrogen weight ratio of about 1, the relative quantity of said urea-nitrogen source being sufficient to provide in said product, from said UAN, about 8 percent to about 57 percent by weight of nitrogen; and, the relative quantity of said ammonium nitrate-nitrogen source being sufficient to supply in said product, from said ammonium nitrate, about 4 percent to about 29 percent by weight of nitrogen; the relative quantity of said urea-nitrogen source, phosphoric acid source, and ammonium nitrate-nitrogen source being sufficient to provide in said product a weight ratio of $P_2O_5$ to total nitrogen in the range of from about 0.61 to about 0.12, a weight ratio of urea-nitrogen to ammonium nitrate-nitrogen in the range of from about $1 \times 10^6$ to about 2.42, and a weight ratio of urea-nitrogen to ammonium nitrate-nitrogen plus $P_2O_5$ in the range of from about 1.24 to about 1.81.

2. The improved high-analysis fertilizer solution products of claim 1 wherein the grade thereof ranges from about 24-12-0 to about 30-4-0.

3. The improved high-analysis fertilizer solution products of claim 1 wherein said TPN is about 35 weight percent and wherein said relative quantity of said urea-nitrogen source, phosphoric acid source, and ammonium nitrate-nitrogen source is sufficient to provide in said product a weight ratio of $P_2O_5$ to total nitrogen in the range of from about 0.54 to about 0.32, a weight ratio of urea-nitrogen to ammonium nitrate-nitrogen in the range of from about 15.25 to about 3.75, and a weight ratio of urea-nitrogen to ammonium nitrate-nitrogen plus $P_2O_5$ in the range of from about 1.41 to about 1.59.

4. The improved high-analysis fertilizer solution products of claim 3 wherein the grade thereof ranges from about 23-12-0 to about 24.5-10.5-0.

5. The improved high-analysis fertilizer solution products of claim 3 wherein said relative quantity of said urea-nitrogen source, phosphoric acid source, and ammonium nitrate-nitrogen source is sufficient to provide in said product a weight ratio of urea-nitrogen to ammonium nitrate-nitrogen in the range of from about 15 to about 4.

6. The improved high-analysis fertilizer solution products of claim 5 wherein the grade thereof ranges from about 24.9-10.2-0 to about 27-8-0.

7. A process for preparing improved high-analysis solution fertilizers, which improved process comprises: introducing into fertilizer solution mixing means, a stream of water of formulation together with streams of a urea-nitrogen source, a phosphoric acid ($P_2O_5$) source, and an ammonium nitrate-nitrogen source; said urea-nitrogen source selected from the group consisting of urea, urea and ammonium nitrate solution (UAN), urea phosphoric acid adduct, and mixtures thereof; said phosphoric acid source selected from the group consisting of urea phosphoric acid adduct, furnace-grade phosphoric acid having a $P_2O_5$ content ranging from about 54 percent to about 76 percent, wet-process phosphoric acid having a $P_2O_5$ content ranging from about 50 to about 76 percent, and mixtures thereof; said ammonium nitrate-nitrogen source selected from the group consisting of ammonium nitrate, UAN, and mixtures thereof; said UAN consisting essentially of about 34 percent by weight urea, about 46 percent by weight ammonium nitrate, and about 20 percent by weight water, and said UAN having a urea-nitrogen to ammonium nitrate-nitrogen weight ratio of about 1, the relative quantity of said urea-nitrogen source being sufficient to provide in said fertilizers, from said UAN, about 8 percent to about 57 percent by weight of nitrogen; and, the relative quantity of said ammonium nitrate-nitrogen source being sufficient to supply in said fertilizers, from said ammonium nitrate, about 4 percent to about 29 percent by weight of nitrogen; the relative quantity of said urea-nitrogen source, phosphoric acid source, and ammonium nitrate-nitrogen source being sufficient to provide in said fertilizers a weight ratio of $P_2O_5$ to total nitrogen in the range of from about 0.61 to about 0.12, a weight ratio of urea-nitrogen to ammonium nitrate-nitrogen in the range of from about $1 \times 10^6$ to about 2.42, and a weight ratio of urea-nitrogen to ammonium nitrate-nitrogen plus $P_2O_5$ in the range of from about 1.24 to about 1.81; said resulting high-analysis solution fertilizers being characterized by the fact that they are clear and substantially free, at temperatures as low as about 0° C., of precipitates generated in situ, have a grade ranging from about 24-12-0 to about 30-4-0, and have a total plant nutrient (TPN) content, expressed as the sum of ($N + P_2O_5 + K_2O$) in the range of about 34 weight percent to about 36 weight percent.

8. The process of claim 7 wherein the grade thereof ranges from about 24.9-10.2-0 to about 23.7-10.4-0.

9. The process of claim 7 wherein said TPN is about 35 weight percent and the relative quantity of said urea-nitrogen source, phosphoric acid source, and ammonium nitrate-nitrogen source is sufficient and proportioned to effect, in the resulting improved high-analysis solution fertilizers, a weight ratio of $P_2O_5$ to total nitrogen in the range of from about 0.54 to about 0.32, a weight ratio of urea-nitrogen to ammonium nitrate-nitrogen in the range of from about 15.25 to about 3.75, and a weight ratio of urea-nitrogen to ammonium nitrate-nitrogen plus $P_2O_5$ in the range of from about 1.41 to about 1.59.

10. The process of claim 9 wherein the grade thereof ranges from about 23-12-0 to about 24.5-10.5-0.

11. The process of claim 9 wherein the relative quantity of said urea nitrogen source, phosphoric acid source, and ammonium nitrate-nitrogen source is sufficient and proportioned to effect in the resulting improved high-analysis solution fertilizers a weight ratio of urea-nitrogen to ammonium nitrate-nitrogen in the range of from about 15 to about 4.

12. The process of claim 11 wherein the grade thereof ranges from about 25-10-0 to about 27-8-0.

* * * * *